US009847857B2

(12) United States Patent
Guerreiro et al.

(10) Patent No.: US 9,847,857 B2
(45) Date of Patent: Dec. 19, 2017

(54) ESTABLISHING A COMMUNICATION LINK BETWEEN USER EQUIPMENTS

(71) Applicant: TELEFONAKTIEBOLAGET L M ERICSSON (PUBL), Stockholm (SE)

(72) Inventors: Igor M. Guerreiro, Fortaleza (BR); Francisco Rodrigo Porto Cavalcanti, Fortaleza (BR); Tarcisio F. Maciel, Fortaleza (BR); Francisco H. C. Neto, Fortaleza (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 18 days.

(21) Appl. No.: 14/897,371

(22) PCT Filed: Jan. 22, 2014

(86) PCT No.: PCT/IB2014/058467
§ 371 (c)(1),
(2) Date: Dec. 10, 2015

(87) PCT Pub. No.: WO2014/207579
PCT Pub. Date: Dec. 31, 2014

(65) Prior Publication Data
US 2016/0134396 A1   May 12, 2016

(30) Foreign Application Priority Data

Jun. 26, 2013   (WO) ................. PCT/EP2013/063375

(51) Int. Cl.
*H04L 5/00* (2006.01)
*H04W 76/02* (2009.01)
(Continued)

(52) U.S. Cl.
CPC ........ *H04L 5/0033* (2013.01); *H04L 27/0006* (2013.01); *H04W 16/14* (2013.01);
(Continued)

(58) Field of Classification Search
CPC .. H04L 5/0033; H04L 27/0006; H04W 76/02; H04W 72/02; H04W 48/16; H04W 16/14; H04W 84/18
See application file for complete search history.

(56) References Cited

U.S. PATENT DOCUMENTS

| 2011/0255448 A1* | 10/2011 | Hartman | ............. H04L 27/0006 370/277 |
| 2013/0013806 A1* | 1/2013 | Woo | .................... H04W 72/005 709/238 |
| 2013/0094537 A1* | 4/2013 | Hui | ........................ H04B 1/713 375/134 |

OTHER PUBLICATIONS

Theis, et al., Rendezvous for Cognitive Radios, IEEE Transactions on Mobile Computing, vol. 10, No. 2, Feb. 1, 2011, pp. 216-227.
(Continued)

*Primary Examiner* — Kwang B Yao
*Assistant Examiner* — Moo Ryong Jeong

(57) ABSTRACT

Methods and apparatus for establishing a communication link between a first user equipment and at least one other user equipment in a radio communication cell using a radio frequency spectrum divided into a plurality of channels. The first user equipment comprises a tuner configured to tune a communication unit to channels of a channel sequence vector in order. The channel sequence vector comprises at least a partial vectorization of a symmetric Toeplitz matrix formed from a set of the plurality of channels. The communication unit is configured, at each channel, to receive link data for establishing a communication link with the at least one other user equipment. A link establisher is configured to establish a communication link with the at least one other user equipment over the tuned channel if the link data is received.

15 Claims, 4 Drawing Sheets

(51) Int. Cl.
*H04W 72/02* (2009.01)
*H04W 48/16* (2009.01)
*H04W 84/18* (2009.01)
*H04W 16/14* (2009.01)
*H04L 27/00* (2006.01)

(52) U.S. Cl.
CPC .......... *H04W 48/16* (2013.01); *H04W 72/02* (2013.01); *H04W 76/02* (2013.01); *H04W 84/18* (2013.01)

(56) References Cited

OTHER PUBLICATIONS

DaSilva, et al., Sequence-based Rendezvous for Dynamic Spectrum Access, 3rd IEEE Symposium on New Frontiers in Dynamic Spectrum Access Networks, Oct. 14, 2008, pp. 1-7.
Lin, et al., Jump-Stay Based Channel-hopping Algorithm with Guaranteed Rendezvous for Cognitive Radio Networks, IEEE International Conference on Computer Communications, Apr. 2011, pp. 2444-2452.
Akyildiz, et al., NeXt generation/dynamic spectrum access/cognitive radio wireless networks: A survey, Elsevier Computer Networks, vol. 50, Issue 13, Sep. 2006, pp. 2127-2159.
Massey, et al., Distribution of Eigenvalues of Real Symmetric Palindromic Toeplitz Matrices and Circulant Matrices, Journal of Theoretical Probability, vol. 20, No. 3, May 5, 2007, pp. 637-662.

* cited by examiner

ESTABLISHING A COMMUNICATION LINK BETWEEN USER EQUIPMENTS

This application is a 371 of International Application No. PCT/IB2014/058467, filed Jan. 22, 2014, which claims the benefit of International Application No. PCT/EP2013/063375, filed Jun. 26, 2013, the disclosure of which is fully incorporated herein by reference.

TECHNICAL FIELD

The invention relates to methods and apparatus for establishing a communication link between at least two user equipments (UEs). In particular, the invention may relate to, but is not limited to, establishing a communication link between at least two UEs in a radio communication cell using a radio frequency spectrum divided into a plurality of channels.

BACKGROUND

As use of radio frequency (RF) devices in telecommunications networks increases, a higher and higher number of devices are trying to communicate over a limited amount of RF spectrum. In next generation networks, it may be desirable to overcome this by managing the use of the RF spectrum through more flexible protocols and policies.

Typically, in a radio communication cell forming part of a wider telecommunications network, a finite amount of RF spectrum is divided into a plurality of discrete channels. Dynamic spectrum access (DSA) technologies allow access to those channels within a radio communication cell in a dynamic manner, reducing inefficiency in RF spectrum usage and so providing gains in terms of network capacity.

In some DSA technologies, primary UEs (PUs) are served by a base station in a radio communication cell and have license to use the channels of the RF spectrum provided by that base station as they require services such as data and voice. In general, all of the channels are not in use all the time, which provides the opportunity for use of those channels by unlicensed users. In this sense, secondary UEs (SUs) may be defined as unlicensed users and can take advantage of times when the channels are not in use by PUs, without causing any impairment to the services required by the PUs.

The SUs may establish a communication link by rendezvous. Generally, rendezvous can be considered the process of two or more UEs completing a "handshake" to establish a communication link in an idle channel.

The implementation of a rendezvous between UEs is non-trivial and two systems are commonly applied. These are namely, the aided (or infrastructure-based) system and the unaided (or infrastructure-less) system. In an aided rendezvous system, the support for UEs to achieve a rendezvous is often performed by means of a central controller or a common central control channel. This simplifies the rendezvous process but is an approach vulnerable to jamming and overload attacks due to its low flexibility and scalability. On the other hand, an unaided system delegates to the UEs the task of finding available channels in a distributed manner. In practice, such an approach is often preferred because setting up a control channel in a DSA network might not be feasible.

The search of potential spectrum or channels for rendezvous without the aid of a control channel is commonly termed "blind rendezvous". For instance, channel-hopping techniques offer a way to cope with blind rendezvous, ensuring the link establishment for a particular number of cases and limiting the maximum time-to-rendezvous (TTR). This is particularly true for symmetric hopping-based rendezvous techniques, in which the set of available channels of the hopping sequence is equal for all UEs.

For symmetric hopping-based rendezvous, another important aspect is time synchronization, which is achieved when all users in the system start their hopping sequence in a synchronous way, that is, without any delay among them. Synchronous rendezvous can be implemented by relying on a global synchronization signal, which may be provided over a control channel. However, asynchronous rendezvous is also possible, in which UEs attempt rendezvous without being synchronised with each other. Asynchronous rendezvous may be considered more general and does not demand additional infrastructure.

A generated orthogonal sequence (GOS) algorithm is disclosed in the asynchronous symmetric hopping-based rendezvous system of L. A. Dasilva and I. Guerreiro, "Sequence-based rendezvous for dynamic spectrum Access," in $3^{rd}$ IEEE Symposium on New Frontiers in Dynamic Spectrum Access Networks, 2008, pp. 1-7, October 2008. Therein, UEs, which may comprise a radio element, employ sequence-based generators to determine an order of channel search for rendezvous. The sequences are determined so as to ensure rendezvous. The GOS algorithm provides limited maximum TTR values as well as a bounded expected TTR. In N. C. Theis, R. W. Thomas, and L. A. DaSilva, "Rendezvous for cognitive radios," in IEEE Transactions on Mobile Computing, vol. 10, no. 2, pp. 216-227, February 2011, a modular clock (MC) algorithm is disclosed, which generates channel hopping sequences using prime number modular arithmetic and random hopping rates. Therein, the MC algorithm is shown to outperform the GOS algorithm in terms of expected TTR with high probability. Nevertheless, a drawback of the MC algorithm is that it does not ensure rendezvous if by chance UEs set the same value to their random hopping rates.

A jump-stay (JS) algorithm is proposed in Z. Lin, H. Liu, X. Chu, and Y.-W. Leung, "Jump-stay based channel-hopping algorithm with guaranteed rendezvous for cognitive radio networks," in IEEE International Conference on Computer Communications, 2011, pp. 2444-2452, April 2011. Such an algorithm assures rendezvous for any pair of users in an asynchronous symmetric channel hopping-based rendezvous system. Therein, channel hopping sequences comprise two parts: a jump pattern; and a stay pattern. The former is generated using prime number modular arithmetic and encompasses a subset of the channels available for hopping. The latter encompasses a single channel (determined by the user) which is consecutively visited a number of times. The hopping sequence is generated continuously by each user until rendezvous occurs. For the JS algorithm, the expected TTR presents smaller values than those obtained with the GOS and MC algorithms. However, the JS algorithm requires the run and build of the hopping sequence in a dynamic fashion while the GOS algorithm only requires that its generated sequence be known by all users. As such, the JS algorithm is complicated and computationally intensive.

SUMMARY

It is an object of the invention to alleviate some of the disadvantages with current methods and apparatus for managing the establishment of communications links between UEs.

According to the invention in a first aspect, there is provided a user equipment (108) for establishing a communication link with at least one other user equipment in a radio communication cell (102) using a radio frequency spectrum divided into a plurality of channels. The user equipment comprises a tuner (208) configured to tune a communication unit (203) to channels of a channel sequence vector in order. The channel sequence vector comprises at least a partial vectorization of a symmetric Toeplitz matrix formed from a set of the plurality of channels. The communication unit is configured, at each channel, to receive link data for establishing a communication link with the at least one other user equipment. The user equipment further comprises a link establisher (210) configured to establish a communication link with the at least one other user equipment over a tuned channel if the link data is received.

The Toeplitz matrix provides an order of elements, which represent the channels of the radio communication cell, that ensures a rendezvous. Further, the use of the Toeplitz matrix provides an algorithm that is less computationally intensive than known algorithms.

Optionally, the user equipment further comprises a matrix generator (212) configured to generate the symmetric Toeplitz matrix, and a vector generator (214) configured to generate the channel sequence vector.

Optionally, the plurality of channels comprises N channels and wherein the vector generator (214) is configured to generate the channel sequence vector by a vectorization of at least 3N elements of the symmetric Toeplitz matrix.

Optionally, the vector generator (214) is configured, before vectorization, to delete the first or last row or column of the symmetric Toeplitz matrix to produce an updated matrix.

Optionally, the vector generator (214) is further configured, before vectorisation, to replace the deleted row or column with a row or column entirely populated with a channel at a first element of the symmetric Toeplitz matrix, to produce the updated matrix.

Optionally, the updated matrix has been produced by deletion or replacement the first or last row of the symmetric Toeplitz matrix and the vector generator (214) is configured to generate the channel sequence vector by concatenating a plurality of the rows of the updated matrix.

Optionally, the updated matrix has been produced by deletion or replacement of the first or last column of the symmetric Toeplitz matrix and the vector generator (214) is configured to generate the channel sequence vector by stacking a plurality of the columns of the updated matrix.

Optionally, the matrix generator (212) is configured to rank the available channels in terms of desirability and to assign each channel to an element of the symmetric Toeplitz matrix based on the desirability.

A channel may be preferred over the others if it provides a better performance. For instance, the link established over that channel has higher quality. Then, that channel may be considered more desirable than other channels Optionally, the matrix generator (212) is configured to assign the most desirable channel to an element of the symmetric Toeplitz matrix having the highest probability of providing a rendezvous.

Optionally, the communication unit (203) is configured to receive a beacon from the at least one other user equipment for establishing a rendezvous.

Optionally, the communication unit (203) is configured to transmit a beacon to the at least one other user equipment for establishing a rendezvous.

Optionally, the communication unit (203) is configured to receive the channel sequence vector over a control channel of the radio communication cell (102).

According to the invention in a second aspect, there is provided a method for operating a user equipment (108). The user equipment is for establishing a communication link with at least one other user equipment in a radio communication cell (102) using a radio frequency spectrum divided into a plurality of channels. The method comprises a tuner (208) tuning (408) a communication unit (203) to channels of a channel sequence vector in order. The channel sequence vector comprises at least a partial vectorization of a symmetric Toeplitz matrix formed from a set of the plurality of channels. The method further comprises the communication unit listening (410), at each channel, for receipt of link data for establishing a communication link with the at least one other user equipment. The method further comprises a link establisher (210) establishing (412) a communication link with the at least one other user equipment over a tuned channel if the link data is received.

According to the invention in a third aspect, there is provided a non-transitory computer readable medium (209) comprising computer readable code configured, when read by a computer, to carry out the method described above.

According to the invention in a fourth aspect, there is provided a computer program (207) comprising computer readable code configured, when read by a computer, to carry out the method described above.

According to the invention in a fifth aspect, there is provided a control node (501) for use in a system (100) for establishing a communication link between at least a first user equipment (108a) and a second user equipment (108b) in a radio communication cell (102) using a radio frequency spectrum divided into a plurality of channels. The control node comprises a matrix generator (512) configured to generate a symmetric Toeplitz matrix from a set of the plurality of channels. The control node further comprises a vector generator (514) configured to generate a channel sequence vector by at least a partial vectorization of a symmetric Toeplitz matrix. The control node further comprises a communication unit (503) configured to transmit the channel sequence vector to the first and/or second user equipments.

According to the invention in a sixth aspect, there is provided a method for operating a control node (501). The control node is for use in a system (100) for establishing a communication link between at least a first user equipment (108a) and a second user equipment (108b) in a radio communication cell using a radio frequency spectrum divided into a plurality of channels. The method comprises a matrix generator (512) generating (602) a symmetric Toeplitz matrix from a set of the plurality of channels. The method further comprises a vector generator (514) generating (604) a channel sequence vector by at least a partial vectorization of a symmetric Toeplitz matrix. The method further comprises a communication unit (503) transmitting (606) the channel sequence vector to the first and/or second user equipments.

According to the invention in a seventh aspect, there is provided a non-transitory computer readable medium (509) comprising computer readable code configured, when read by a computer, to carry out the method described above.

According to the invention in an eighth aspect, there is provided a computer program (507) comprising computer readable code configured, when read by a computer, to carry out the method described above.

According to the invention in a ninth aspect, there is provided a system (100) for establishing a communication link between at least a first user equipment (108a) and a second user equipment (108b) in a radio communication cell (102) using a radio frequency spectrum divided into a plurality of channels. The system comprises a first tuner (208) forming part of the first user equipment (108a) configured to tune a first communication unit (203) to channels of a channel sequence vector in order. The channel sequence vector comprises at least a partial vectorization of a symmetric Toeplitz matrix formed from a set of the plurality of channels. The first communication unit is configured, at each channel, to receive link data for establishing a communication link with the second user equipment. The system further comprises a second tuner (208) forming part of the second user equipment configured to tune a second communication unit (203) to channels of the channel sequence vector in order. The second communication unit is configured, at each channel, to transmit link data for establishing a communication link with the first user equipment. The first user equipment further comprises a first link establisher (210) configured to establish a communication link with the at least one other user equipment over a tuned channel if the link data is received by the first communication unit.

According to the invention in a tenth aspect, there is provided a method for establishing a communication link between at least a first user equipment (108a) and a second user equipment (108b) in a radio communication cell (102) using a radio frequency spectrum divided into a plurality of channels. The method comprises a first tuner (208) forming part of the first user equipment tuning a first communication unit (203) to channels of a channel sequence vector in order. The channel sequence vector comprises at least a partial vectorization of a symmetric Toeplitz matrix formed from a set of the plurality of channels. The method further comprises, at each channel, the first communication unit listening for receipt of link data for establishing a communication link with the second user equipment. The method further comprises a second tuner (208) forming part of the second user equipment tuning a second communication unit (203) to channels of the channel sequence vector in order. The method further comprises, at each channel, the second communication unit transmitting link data for establishing a communication link with the first user equipment. The method further comprises a first link establisher (210) forming part of the first user equipment establishing a communication link with the at least one other user equipment over a tuned channel if the link data is received by the first communication unit.

According to the invention in an eleventh aspect, there is provided a non-transitory computer readable medium comprising computer readable code configured, when read by a computer, to carry out the method described above.

According to the invention in a twelfth aspect, there is provided a computer program comprising computer readable code configured, when read by a computer, to carry out the method described above.

BRIEF DESCRIPTION OF FIGURES

Exemplary methods and apparatus are described herein with reference to the accompanying drawings, in which.

DESCRIPTION

Figure 1:
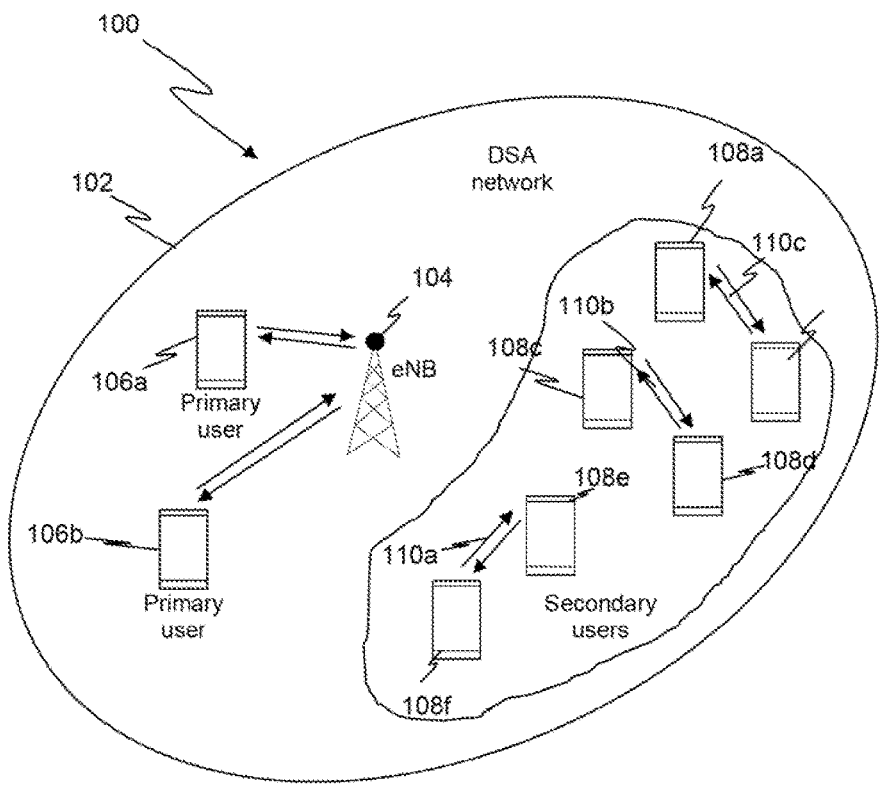
FIG. 1 is a schematic diagram of a system for establishing a communication link between at least two UEs.

FIG. 1 shows an example of a system 100 for establishing a communication link between UEs in a radio communication cell 102 having a base station 104 (e.g. an enhanced node B, or eNodeB) serving PUs 106a, 106b. A plurality of SUs 108a-f may establish communication links with each other by utilising the channels 110a-c.

Generally, disclosed herein are methods and apparatus for establishing a communication link 110a-c between at least two radio based UEs 108a-f. The UEs 108a-f may be located in a radio communications cell 102 served by a base station 104, as shown in FIG. 1.

The SU UEs 108a-f may seek to rendezvous with each other to establish the communication link 110a-c and may do this by a channel hopping method. Specifically, each of the SU UEs 108a-f may hop through a set of channels of the radio communication cell 102, the channels being represented in a channel sequence vector that places the channels in a particular order. One or more of the SU UEs 108a-f may then send and/or receive linking data suitable to establish a connection with another of the SU UEs 108a-f. The order of the channels in the channel sequence vector allows for asynchronous and homogenous rendezvous, low and tightly bounded expected time to rendezvous (TTR) and low and tightly bounded maximum TTR, among other advantages.

The inventors have appreciated that a problem exists of how to design a sequence for use in UEs, in particular for asynchronous symmetric channel-hopping-based rendezvous between at least two UEs that provides rendezvous and presents low and bounded minimum, maximum and expected TTR.

In the methods and apparatus disclosed herein the system 100 may relate to a general DSA network provided in a radio communication cell 102 served by a base station 104 and having a radio frequency spectrum divided into a plurality of available channels. The plurality of N channels can be represented by the set, C:

$$C=\{c_1, c_2, \ldots, c_N\}$$

In exemplary methods and apparatus, the DSA network may have a central control channel, across which control data may be transmitted by a control node. In other exemplary methods and apparatus, no central control channel is necessary and the UEs 108a-f may attempt rendezvous asynchronously. In exemplary methods and apparatus, the RF spectrum provided in the radio communication cell 102 (i.e. the set of channels, C) may be available for the exchange of data and/or control information. In the methods and apparatus disclosed herein, it is assumed that the set, C, is also available for rendezvous. However, in other methods and apparatus, only a subset of the plurality of N channels may be available for rendezvous. Therefore, herein, the set, C, is referred to as being the set of channels available for rendezvous. The UEs 108a-f may be represented as a set, U, of K UEs 108a-f:

$$U=\{1, 2, \ldots, K\}$$

Further, in the methods and apparatus disclosed, the DAS network is assumed to be symmetric, that is, each UE in the set, U, has access to the same set of channels, C, for rendezvous. Each UE 108 may be classified as an SU so they each have the same priority in accessing the channels of the RF spectrum. However, the methods and apparatus disclosed may be equally applicable to non-symmetric DAS networks.

As used herein, the term "rendezvous" encompasses the event where two or more UEs complete handshaking in an idle channel. The methods and apparatus disclosed herein relate to rendezvous algorithms based on channel-hopping sequences in time-slotted systems, where rendezvous occurs at a certain instant of time (or time slot). In this sense, each UE 108 periodically hops to the next channel in a cyclic channel sequence vector, S:

$$S_k = (s_0^{(k)}, s_1^{(k)}, \ldots, s_{L-1}^{(k)}), s_l^{(k)} \in C, k \in U$$

In the above: k denotes a UE 108 of the set, U; $S_k$ denotes a channel sequence vector for a given UE, k; and $s_l^{(k)}$ denotes one of the plurality of channels in the set, C. In exemplary methods and apparatus, the channel sequence vector, S, comprises L elements. The L elements comprise each of the channels in the set, C. In exemplary methods and apparatus, each of the channels C will appear in the channel sequence vector, S, more than once, as specified below.

The channel sequence vector, S, wraps around, such that a UE 108 cycles through the vector until the occurrence of rendezvous with another UE 108. For the sake of simplicity, methods and apparatus disclosed relate to a UE 108 rendezvousing with one other UE 108 at a time with no collision during handshaking. However, it is noted that a UE 108 may additionally rendezvous with more than one other UEs 108 at the same time. Also, in exemplary methods and apparatus, it is assumed, without loss of generality, that one of the UEs 108 listens while another UE 108 sends beacons in order to establish a communication link.

In one example, there is no synchronization among UEs 108a-f, which may therefore start their hopping sequences at different time slots represented by a certain relative delay, τ. Mathematically, a rendezvous between UEs k and j occurs when $$s_t^{(k)} = s_{t-\tau}^{(j)}, k, j \in U$$

That is, a rendezvous occurs when the channel in the vector for UE, k, at time slot, t, is equal to the channel in the vector for UE, j, at time slot, t–τ. Therefore, t–τ represents the TTR defined in a time slot domain. In addition $$\tau \in [0\ L-1]$$

represents that the relative time delay, τ, is within the limits of 0 and L–1, and $$TTR \in [1\ L]$$

represents that TTR is within the limits of 1 and L, and since any vector, S, is cyclic $$s_t^{(k)} = s_{t+L}^{(k)}, \forall k \in U\ \text{and}\ \forall t$$

Figure 2:
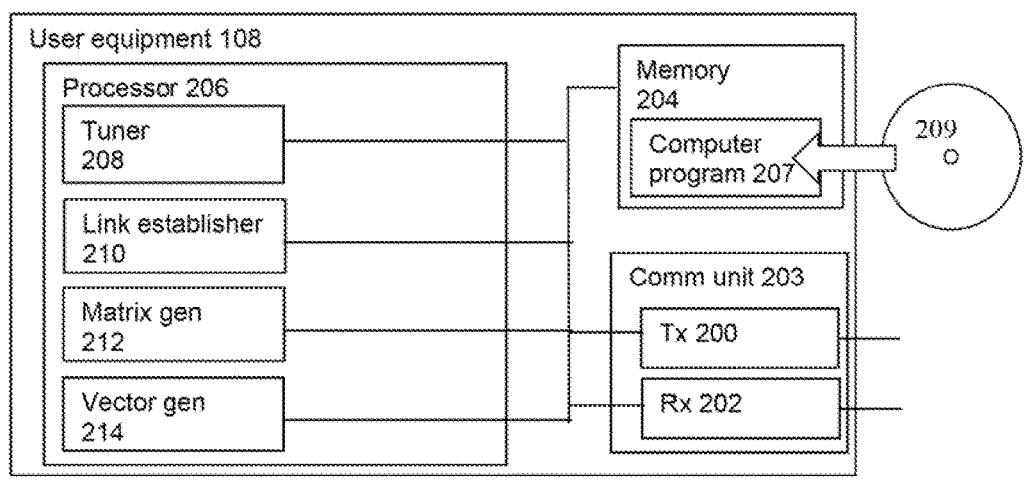
FIG. 2 is a schematic diagram of a UE.

FIG. 2 shows a schematic representation of a user equipment 108. The user equipment 108 comprises a transmitter 200 and a receiver 202, which form part of a communication unit 203. The transmitter 200 and receiver 202 are in electrical communication with other nodes, UEs and/or functions in a network system and are configured to transmit and receive data accordingly.

The user equipment 108 further comprises a memory 204 and a processor 206. The memory 204 may comprise a non-volatile memory and/or a volatile memory. The memory 204 may have a computer program 207 stored therein. The computer program 207 may be configured to undertake the methods disclosed herein. The computer program 207 may be loaded in the memory 204 from a non-transitory computer readable medium 209, on which the computer program is stored. The processor 206 is configured to undertake the functions of a tuner 208, a link establisher 210, a matrix generator 212 and a vector generator 214.

Each of the transmitter 200, receiver 202, memory 204, processor 206, tuner 208, link establisher 210, matrix generator 212 and vector generator 214 is in electrical communication with the other features 200, 202, 203, 204, 206, 208, 210, 212, 214 of the user equipment 108. The user equipment 108 can be implemented as a combination of computer hardware and software. In particular, the tuner 208, the link establisher 210, the matrix generator 212 and the vector generator 214 may be implemented as software configured to run on the processor 206. The memory 204 store the various programs/executable files that are implemented by a processor 206, and also provide a storage unit for any required data. The programs/executable files stored in the memory 204, and implemented by the processor 206, can include the tuner 208, the link establisher 210, the matrix generator 212 and the vector generator 214, but are not limited to such.

Exemplary methods and apparatus disclosed herein identify a set of channels available for rendezvous and generate a channel sequence vector, which may be shared by at least two UEs 108 wishing to perform rendezvous. The elements of the channel sequence vector may comprise at least a partial vectorization of the elements of a symmetric Toeplitz matrix formed using the channels of the set, C. Formation of the symmetric Toeplitz matrix is discussed below.

In specific exemplary methods and apparatus, the elements of the channel sequence vector may comprise one or more stacked columns of the symmetric Toeplitz matrix except the last column, or one or more concatenated rows of the symmetric Toeplitz matrix except the last row. The vector may therefore be formed from the at least partial vectorization of the symmetric Toeplitz matrix after removal of the first or last row or column. The first row of the symmetric Toeplitz matrix corresponds to the channels $$[c1, c2, \ldots cN-1, cN, cN, cN-1, \ldots, c2, c1]$$

That is, the channels of the set, C, are organized in an order (c1-cN) followed by the same channels organized in the reverse of that order (cN-c1).

Figure 3:
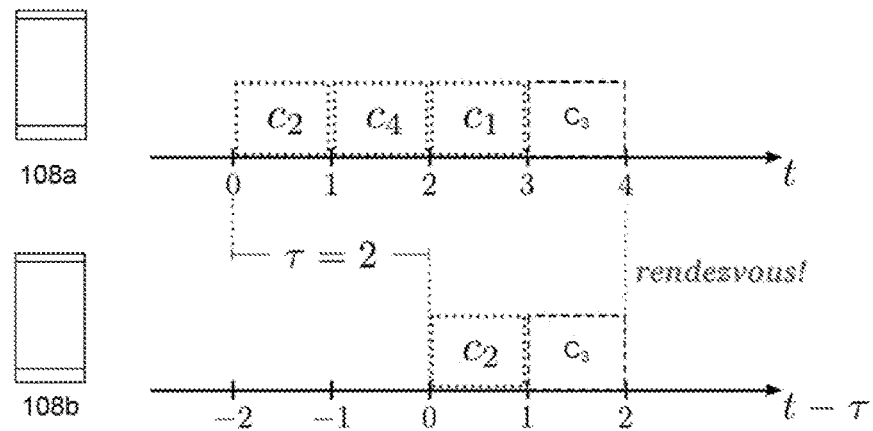
FIG. 3 is a timing diagram showing establishment of a communication link.

FIG. 3 shows a timing diagram for rendezvous between a first UE 108a and a second UE 108b over a channel c3 represented by the channel 110a in FIG. 1. In the example shown in FIG. 3, the two UEs 108a, 108b try to rendezvous with each other in a radio communication cell 102 with at least four available channels, that is N≥4. In this example, the UEs 108a, 108b are not synchronized and this is shown by the delay of the second UE 108b by τ=2 with respect to first UE 108a. In addition, the first UE 108a is configured to tune its communication unit 203 to channels based on the vector {c2, c4, c1, c3, . . . }, and the second UE 108b is configured to tune its communication unit 203 to channels based on the vector {c2, c3, . . . }. As illustrated in FIG. 3, the first and second UEs 108a, 108b tune their communication units according to their respective vectors at each timeslot t0-t4 and attempt to establish a communication link with each other after each tune. Given the delay τ=2, the UEs 108a, 108b rendezvous on channel c3 at time slot t4, with TTR=2.

Figure 4:
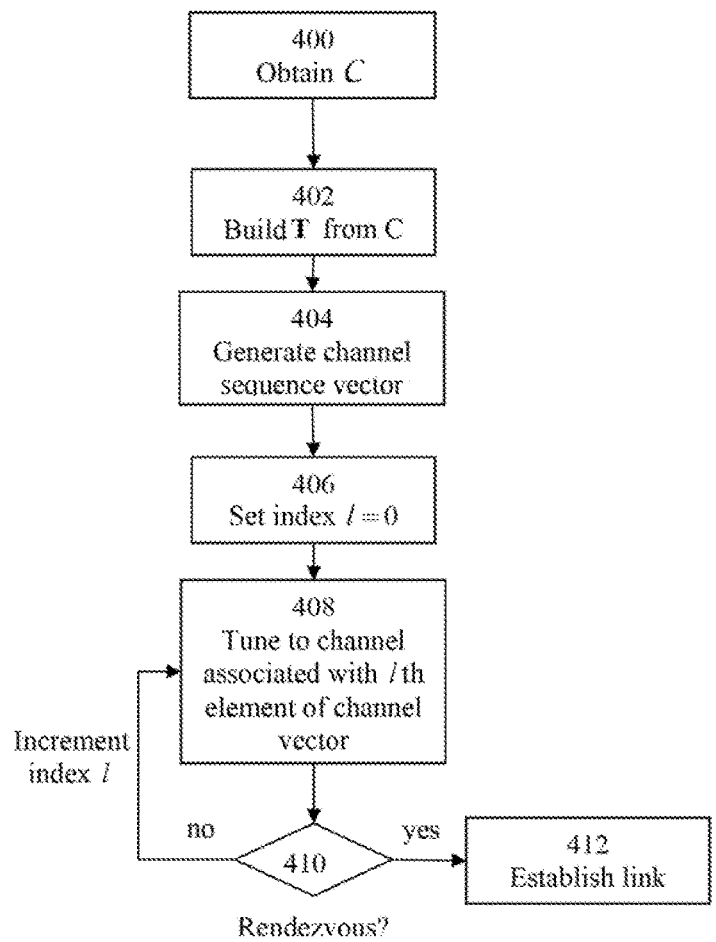
FIG. 4 is a flow diagram for a method for operating a UE.

Referring to FIG. 4, an exemplary method for establishing a communication link between at least two UEs 108 is described. The method shown in FIG. 4 is asynchronous in that there is no synchronicity between the UEs 108a-f when channel hopping. However, the methods and apparatus disclosed herein may also be used in synchronous methods.

Each UE 108 wishing to establish a communication link with another UE 108 obtains 400 the set of channels, C, available for rendezvous in the radio communication cell 102. The UE 108 may obtain this by transmitting from the transmitter 200 a request for data relating to the available channels to the base station 104 or any other device in the system 100 and receiving the requested data at the receiver 202. Alternatively, the UE 108 may be configured to sense the RF spectrum in the radio communications cell 102. The UE 108 may then determine on its own the channels which are available for rendezvous (e.g., channels that are vacant/unused).

Based on the obtained set of channels, the matrix generator 212 of the UE 108 generates 402 a symmetric Toeplitz matrix, T. This is done by firstly generating a base vector, v:

$$v=[c1, c2, \ldots cN-1, cN, cN, cN-1, \ldots c2, c1]$$

When generating the base vector, the matrix generator 212 may be configured to assign particular channels to each of the elements of the base vector, v, based on the desirability of that channel. That is, if a particular channel provides a relatively good service, that channel may be assigned to the element of the base vector that has the highest probability of providing a rendezvous between the UEs 108a-f. In methods and apparatus in which the channel sequence vector comprises at least 3N elements (i.e. L≥3N), the order of the elements (c1-cN) of the base vector, v, in terms of the probability of providing a rendezvous is:

1. c2
2. c3-cN−1
3. cN
4. c1

Therefore, the matrix generator 212 may be configured to assign the most desirable channel to c2 and the least desirable channel to c1.

The base vector, v, forms the first row of the symmetric Toeplitz matrix, T:

$$T = \begin{bmatrix} c_1 & c_2 & \cdots & c_{N-1} & c_N & c_N & c_{N-1} & \cdots & c_2 & c_1 \\ c_2 & c_1 & \cdots & c_{N-2} & c_{N-1} & c_N & c_N & \cdots & c_3 & c_2 \\ \vdots & \vdots & \ddots & \vdots & \vdots & \vdots & \vdots & \ddots & \vdots & \vdots \\ c_{N-1} & c_{N-2} & \cdots & c_1 & c_2 & c_3 & c_4 & \cdots & c_N & c_{N-1} \\ c_N & c_{N-1} & \cdots & c_2 & c_1 & c_2 & c_3 & \cdots & c_N & c_N \\ c_N & c_N & \cdots & c_3 & c_2 & c_1 & c_2 & \cdots & c_{N-1} & c_N \\ c_{N-1} & c_N & \cdots & c_4 & c_3 & c_2 & c_1 & \cdots & c_{N-2} & c_{N-1} \\ \vdots & \vdots & \ddots & \vdots & \vdots & \vdots & \vdots & \ddots & \vdots & \vdots \\ c_2 & c_1 & \cdots & c_N & c_N & c_{N-1} & c_{N-2} & \cdots & c_1 & c_2 \\ c_1 & c_2 & \cdots & c_{N-1} & c_N & c_N & c_{N-1} & \cdots & c_2 & c_1 \end{bmatrix}$$

It is noted that the Toeplitz matrix, T, shown above is an example of a symmetric Toeplitz matrix, as defined herein. A symmetric Toeplitz matrix encompasses a matrix in which each descending diagonal from left to right is constant, and which displays centrosymmetry and bisymmetry.

Based on the Toeplitz matrix, T, the channel sequence vector used for rendezvous is generated 404 by the vector generator 214. This may be done by at least partially vectorizing the matrix, T. In exemplary methods and apparatus, at least 3N elements of the matrix, T, are vectorised to produce the channel sequence vector. In exemplary methods and apparatus, all of the elements of the matrix, T, are vectorised to produce the channel sequence vector. Exemplary methods and apparatus comprise stripping the last row (or last column) of T because it is equal to the first row (or first column) before the at least partial vectorization of the resulting matrix row-wise (or column-wise). It is noted that in alternative methods and apparatus, the first line (or first column) may be stripped before vectorisation. Due to the particular construction and symmetry of the matrix, T, the first and last row are identical. The same is true for the first and last columns. Therefore, the vectorization procedure can be applied by concatenating elements of the matrix, T, row wise and may comprise the concatenation of a plurality of rows, or alternatively, by stacking elements of the matrix, T, column wise and may comprise the stacking of a plurality of columns.

After stripping of the last column (for example), the matrix T, becomes the updated matrix T':

$$T' = \begin{bmatrix} c_1 & c_2 & \cdots & c_{N-1} & c_N & c_N & c_{N-1} & \cdots & c_2 \\ c_2 & c_1 & \cdots & c_{N-2} & c_{N-1} & c_N & c_N & \cdots & c_3 \\ \vdots & \vdots & \ddots & \vdots & \vdots & \vdots & \vdots & \ddots & \vdots \\ c_{N-1} & c_{N-2} & \cdots & c_1 & c_2 & c_3 & c_4 & \cdots & c_N \\ c_N & c_{N-1} & \cdots & c_2 & c_1 & c_2 & c_3 & \cdots & c_N \\ c_N & c_N & \cdots & c_3 & c_2 & c_1 & c_2 & \cdots & c_{N-1} \\ c_{N-1} & c_N & \cdots & c_4 & c_3 & c_2 & c_1 & \cdots & c_{N-2} \\ \vdots & \vdots & \ddots & \vdots & \vdots & \vdots & \vdots & \ddots & \vdots \\ c_2 & c_1 & \cdots & c_N & c_N & c_{N-1} & c_{N-2} & \cdots & c_1 \\ c_1 & c_2 & \cdots & c_{N-1} & c_N & c_N & c_{N-1} & \cdots & c_2 \end{bmatrix}$$

T' is vectorized column wise to generate 404 the channel sequence vector. As mentioned above, the channel sequence vector may comprise any number of elements of T' (or any other symmetric Toeplitz matrix), but may preferably comprise at least 3N elements. The at least 3N elements may be consecutive elements of the matrix.

At each UE 108, an index, I, is initialized (e.g., set to zero) 406 by the communication unit 203 to index elements of the channel sequence vector when channel hopping.

The tuner 208 tunes the communication unit 203 to the channels of the channel sequence vector in the order in which they appear in the channel sequence vector. This is done at each time slot, t. Therefore, the communication unit 203 may transmit a beacon to the other UE 108 on each channel of the channel sequence vector in turn. The communication unit 203 is configured to receive a beacon from the other UE 108 for establishing a communication link. Specifically, the UE 108 is tuned to the channel (the tuned channel) associated with the Ith element of the channel sequence vector.

In asynchronous systems, the UE 108 may deal with different indices of the channel sequence vector at different time slots to the other UE 108. This is based on the relative delay τ. It is noted again that the channel sequence vector is cyclic so that the tuner 208 tunes the communication unit to the first channel in the channel sequence vector after the last channel in the channel sequence vector.

At each tuned channel, the communication unit 203 attempts to establish 410 a communication link via a rendezvous, as described above. If the communication unit 203 receives link data for establishing a rendezvous from the other UE 108, the link establisher 210 establishes 412 a communication link with the other UE 108. If the communication unit 203 does not receive data for establishing a rendezvous from the other UE 108, the index, I, is incremented and the communication unit 203 is tuned to the next channel in the channel sequence vector at the next time slot.

As rendezvous is guaranteed, no stopping criterion is needed or specified. Therefore, the procedure runs until occurrence of rendezvous.

In other exemplary methods and apparatus, the updated matrix may be the matrix T'''. The sequence vector may be determined from the updated matrix T'''. In such methods and apparatus, the first or last row or column of the Toeplitz matrix, T, may be deleted and replaced with a row or column to produce an updated matrix T''' comprising an equal number of instances of each of the channels in the set C.

In exemplary methods and apparatus, the deleted row or column may be replaced with a row or column comprising the channel in the first element of the matrix T. The first element may be the element at row 1 and column 1, which may be represented by (1, 1) and, in the case of matrix T, is the channel $c_1$. Therefore, the updated matrix T''' may comprise the matrix T with the first or last row or column replaced by a row or column populated with $c_1$.

The matrix T''' may then be vectorized to create the sequence vector. If the first or last row of T has been replaced to produce T''', the sequence vector comprises the concatenated rows of T'''. If the first or last column of T has been replaced to produce T''', the sequence vector comprises the stacked columns of T'''. In this way, the first or last 2N elements of the sequence are all equal to $c_1$.

The method outlined above in respect of FIG. 4 may be undertaken with the sequence vector determined from T'''.

Figure 5:
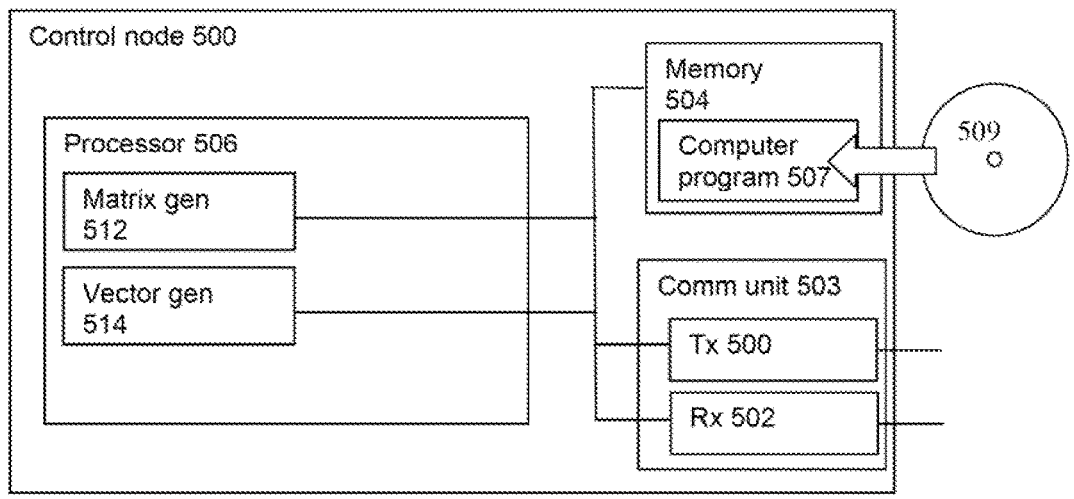
FIG. 5 is a schematic diagram of a control node.

In an aided system having a control channel, the matrix, T, and the channel sequence vector may be transmitted to the UEs 108 by a control node. FIG. 5 shows a schematic representation of a control node 501. The control node may be another UE 106a-b, 108, the base station 104, or another device in the system 100. The control node 501 comprises a transmitter 500 and a receiver 502, which form part of a communication unit 503. The transmitter 500 and receiver 502 are in electrical communication with other nodes, UEs and/or functions in a network system and are configured to transmit and receive data accordingly. The control node 501 further comprises a memory 504 and a processor 506. The memory 504 may comprise a non-volatile memory and/or a volatile memory. The memory 504 may have a computer program 507 stored therein.

The computer program 507 may be configured to undertake the methods disclosed herein. The computer program 507 may be loaded in the memory 504 from a non-transitory computer readable medium 509, on which the computer program is stored. The processor 506 is configured to undertake the functions of a matrix generator 512 and a vector generator 514. Each of the transmitter 500, receiver 502, memory 504, processor 506, matrix generator 512 and vector generator 514 is in electrical communication with the other features 500, 502, 503, 504, 506, 512, 514 of the control node 501. The control node 501 can be implemented as a combination of computer hardware and software.

In particular, the matrix generator 512 and the vector generator 514 may be implemented as software configured to run on the processor 506. The memory 504 store the various programs/executable files that are implemented by a processor 506, and also provide a storage unit for any required data. The programs/executable files stored in the memory 504, and implemented by the processor 506, can include the matrix generator 512 and the vector generator 514, but are not limited to such.

Figure 6:
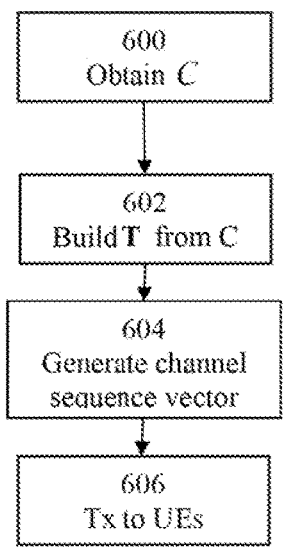
FIG. 6 is a flow diagram for a method for operating a control node.

Referring to FIG. 6, a method for operating a control 501 node is shown. The control node 501 obtains 600 the set, C.

The control node then generates 602 the symmetric Toeplitz matrix, T, based on the set, C. The control node 501 then generates 604 the channel sequence vector. The above steps may be undertaken using the methods as set out above for the UE 108 and are not explained again in detail here. The transmitter 500 of the control node 501 transmits the channel sequence vector to one or more UEs 108 in the system 100. The UEs 108 then undertake method steps 406-412, as set out in relation to FIG. 4 to implement a rendezvous. These steps also are not described again in detail.

Figure 7:
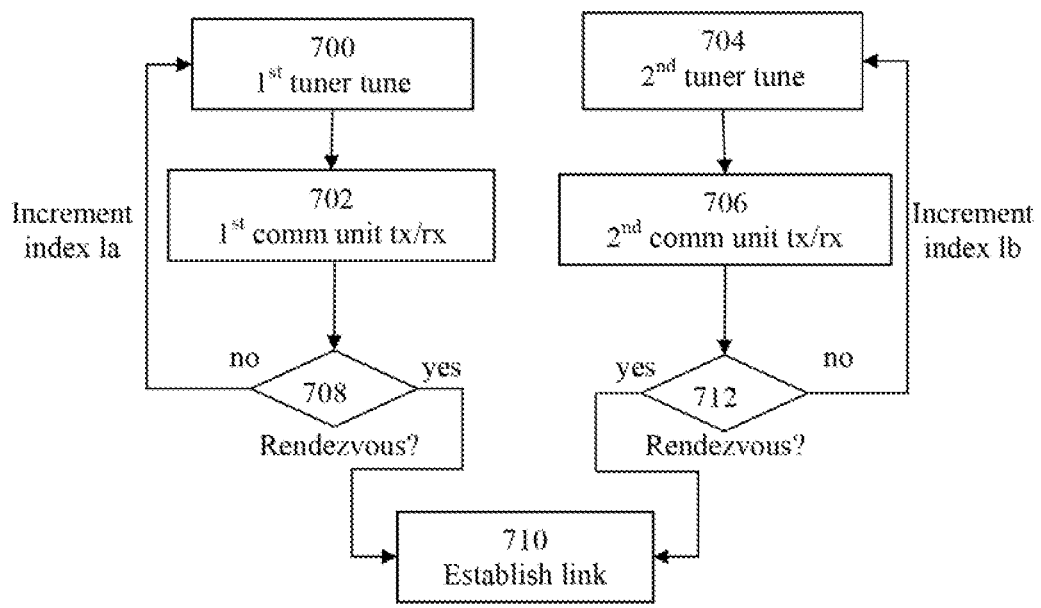
FIG. 7 is a flow diagram for a method for operating a system.

Referring to FIG. 7, a flow diagram for a method for operating a system is shown. In the following description, a first UE 108a comprises the features of FIG. 2 appended with an "a", for example, transmitter 200a and receiver 202a, and a second UE 108b comprises the features of FIG. 2 appended with an "b", for example, transmitter 200b and receiver 202b. Further, the channel sequence vector is considered to have been generated already. That is, the channel sequence vector may have been generated by each of the first and second UEs 108a, 108b, as described above, or may have been generated by a controlling node 501 and transmitted to the first and second UEs, as also described above. Further still, the method of FIG. 7 uses similar features to the methods and apparatus described above in relation to the UE 108 and/or the control node. Therefore, these features are not described again in detail here.

The first tuner 208a of the first UE 108a tunes 700 the first communication unit 203a of the first UE 108a to a channel in the channel sequence vector. The first communication unit 203a then listens on the tuned channel for link data from the second UE 108b. Concurrently, the second tuner 208b of the second UE 108b tunes the second communication unit 203b to a channel in the channel sequence vector. The second communication unit 203b then transmits link data on the tuned channel.

In FIG. 7, the parts of the method undertaken by the first and second UEs 108a, 108b are shown in different branches of the flow diagram. This represents the fact that these processes may be undertaken independently and asynchronously. It is also noted that there may be a relative delay, τ, between the channel hopping of the first and second UEs 108am, 108b.

Further, in the above description, it is assumed that the first UE 108a listens, while the second UE 108b transmits link data. However, this is for the purpose of illustration only and it is noted that, in practical implementations, the first and second communication units 203a, 203b will each transmit and receive link data in the process of establishing a communication link.

If link data is received by the first communication unit 203a and a rendezvous is established 708, the first link establisher 210a of the first UE 108a establishes a link 710 between the first and second UEs 108a, 108b. Similarly, if link data is received by the second communication unit 203b and a rendezvous is established 712, the second link establisher 210b of the second UE 108b establishes a link 710 between the first and second UEs 108a, 108b.

If no link data is received by the first communication unit 203a and no rendezvous is established 708, the first vector generator 214a increments the index, I, and the method returns to tune 700 first communication unit 203a to the next channel in the channel sequence vector. Similarly, if no link data is received by the second communication unit 203b and no rendezvous is established 712, the second vector generator 214b increments the index, I, and the method returns to tune 704 the second communication unit 203b to the next channel in the channel sequence vector.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A user equipment for establishing a communication link with at least one other user equipment in a radio communication cell using a radio frequency spectrum divided into a plurality of channels, the user equipment comprising:
a tuner configured to tune a communication unit to channels of a channel sequence vector in order, wherein the channel sequence vector comprises a partial or full vectorization of a symmetric Toeplitz matrix formed from a set of the plurality of channels, and wherein the communication unit is configured, at each channel, to receive link data for establishing the communication link with the at least one other user equipment; and
a link establisher configured to establish a communication link with the at least one other user equipment over a tuned channel if the link data is received, wherein the communication unit comprises a transmitter and a receiver for electrical communication.

2. The user equipment according to claim 1, further comprising a matrix generator configured to generate the symmetric Toeplitz matrix, and a vector generator configured to generate the channel sequence vector.

3. The user equipment according to claim 2, wherein the plurality of channels comprises N channels and wherein the vector generator is configured to generate the channel sequence vector by a vectorization of at least 3N elements of the symmetric Toeplitz matrix.

4. The user equipment according to claim 2, wherein the vector generator is configured, before vectorization, to delete the first or last row or column of the symmetric Toeplitz matrix to produce an updated matrix.

5. The user equipment according to claim 4, wherein the vector generator is further configured, before vectorisation, to replace the deleted row or column with a row or column entirely populated with a channel at a first element of the symmetric Toeplitz matrix, to produce the updated matrix.

6. The user equipment according to claim 4, wherein the updated matrix has been produced by deletion or replacement of the first or last row of the symmetric Toeplitz matrix and the vector generator is configured to generate the channel sequence vector by concatenating a plurality of the rows of the updated matrix.

7. The user equipment according to claim 4, wherein the updated matrix has been produced by deletion or replacement of the first or last column of the symmetric Toeplitz matrix and the vector generator is configured to generate the channel sequence vector by stacking a plurality of the columns of the updated matrix.

8. The user equipment according to claim 1, wherein a matrix generator is configured to rank the available channels in terms of desirability and to assign each channel to an element of the symmetric Toeplitz matrix based on the desirability.

9. The user equipment according to claim 8, wherein the matrix generator is configured to assign the most desirable channel to an element of the symmetric Toeplitz matrix having the highest probability of providing a rendezvous.

10. The user equipment according to claim 1, wherein the communication unit is configured to receive a beacon from the at least one other user equipment for establishing a rendezvous.

11. The user equipment according to claim 1, wherein the communication unit is configured to transmit a beacon to the at least one other user equipment for establishing a rendezvous.

12. The user equipment according to claim 1, wherein the communication unit is configured to receive the channel sequence vector over a control channel of the radio communication cell.

13. A method for operating a user equipment, the user equipment for establishing a communication link with at least one other user equipment in a radio communication cell using a radio frequency spectrum divided into a plurality of channels, the method comprising:
- a tuner tuning a communication unit to channels of a channel sequence vector in order, wherein the channel sequence vector comprises a partial or full vectorization of a symmetric Toeplitz matrix formed from a set of the plurality of channels;
- the communication unit listening, at each channel, for receipt of link data for establishing the communication link with the at least one other user equipment; and
- a link establisher establishing a communication link with the at least one other user equipment over a tuned channel if the link data is received, wherein the communication unit comprises a transmitter and a receiver for electrical communication.

14. A system for establishing a communication link between at least a first user equipment and a second user equipment in a radio communication cell using a radio frequency spectrum divided into a plurality of channels, the system comprising:
- a first tuner forming part of the first user equipment configured to tune a first communication unit to channels of a channel sequence vector in order, wherein the channel sequence vector comprises a partial or full vectorization of a symmetric Toeplitz matrix formed from a set of the plurality of channels, and wherein the first communication unit is configured, at each channel, to receive link data for establishing the communication link with the second user equipment,
- a second tuner forming part of the second user equipment configured to tune a second communication unit to channels of the channel sequence vector in order, wherein the second communication unit is configured, at each channel, to transmit the link data for establishing the communication link with the first user equipment,
- wherein the first user equipment further comprises a first link establisher configured to establish the communication link with the at least one other user equipment over a tuned channel if the transmitted link data is received by the first communication unit, wherein the first and second communication units comprise a transmitter and a receiver for electrical communication.

15. A method for establishing a communication link between at least a first user equipment and a second user equipment in a radio communication cell using a radio frequency spectrum divided into a plurality of channels, the method comprising:
- a first tuner forming part of the first user equipment tuning a first communication unit to channels of a channel sequence vector in order, wherein the channel sequence vector comprises a partial or full vectorization of a symmetric Toeplitz matrix formed from a set of the plurality of channels;
- at each channel, the first communication unit listening for receipt of link data for establishing the communication link with the second user equipment,
- a second tuner forming part of the second user equipment tuning a second communication unit to channels of the channel sequence vector in order;
- at each channel, the second communication unit transmitting the link data for establishing the communication link with the first user equipment; and
- a first link establisher forming part of the first user equipment establishing the communication link with the at least one other user equipment over a tuned channel if the transmitted link data is received by the first communication unit, wherein the first and second communication units comprises a transmitter and a receiver for electrical communication.

* * * * *